United States Patent
Givon et al.

(10) Patent No.: US 8,548,258 B2
(45) Date of Patent: Oct. 1, 2013

(54) METHOD SYSTEM AND ASSOCIATED MODULES AND SOFTWARE COMPONENTS FOR PROVIDING IMAGE SENSOR BASED HUMAN MACHINE INTERFACING

(75) Inventors: Dor Givon, Rishon-Lezion (IL); Yoram Elichai, Ashdod (IL)

(73) Assignee: Extreme Reality Ltd., Herzliya (IL)

(*) Notice: Subject to any disclaimer, the term of this patent is extended or adjusted under 35 U.S.C. 154(b) by 157 days.

(21) Appl. No.: 13/125,375

(22) PCT Filed: Oct. 25, 2009

(86) PCT No.: PCT/IL2009/000997
§ 371 (c)(1),
(2), (4) Date: Jun. 28, 2011

(87) PCT Pub. No.: WO2010/046901
PCT Pub. Date: Apr. 29, 2010

(65) Prior Publication Data
US 2011/0286673 A1    Nov. 24, 2011

Related U.S. Application Data

(60) Provisional application No. 61/108,454, filed on Oct. 24, 2008.

(51) Int. Cl.
*G06K 9/62* (2006.01)
(52) U.S. Cl.
USPC ........................................ 382/224
(58) Field of Classification Search
USPC ................................ 382/173, 224, 225
See application file for complete search history.

(56) References Cited

U.S. PATENT DOCUMENTS

| | | | |
|---|---|---|---|
| 4,376,950 | A | 3/1983 | Brown et al. |
| 5,130,794 | A | 7/1992 | Ritchey |
| 5,515,183 | A | 5/1996 | Hashimoto |
| 5,691,885 | A | 11/1997 | Ward et al. |
| 5,703,704 | A | 12/1997 | Nakagawa et al. |
| 5,745,719 | A | 4/1998 | Falcon |
| 5,831,633 | A | 11/1998 | Van Roy |
| 5,835,133 | A | 11/1998 | Moreton et al. |
| 5,852,450 | A | 12/1998 | Thingvold |
| 5,909,218 | A | 6/1999 | Naka et al. |

(Continued)

FOREIGN PATENT DOCUMENTS

| | | |
|---|---|---|
| EP | 1 115254 | 7/2001 |
| JP | 2002-216146 | 8/2002 |

(Continued)

OTHER PUBLICATIONS

Carranza et al., "Free-Viewpoint Video of 1-39 Human Actors", Proc. of ACM Siggraph 2003, Jul. 27, 2003.

(Continued)

*Primary Examiner* — Daniel Mariam
(74) *Attorney, Agent, or Firm* — Vladimir Sherman; Professional Patent Solutions

(57) ABSTRACT

Disclosed is an image based human machine interface which comprises an image acquisition assembly which may acquire one or more of two-dimensional images of a user, wherein substantially each image may be associated with a different point in time. The human machine interface further comprises a processing unit which may classify one or more groups of pixels as either background or foreground.

25 Claims, 9 Drawing Sheets

(56) References Cited

U.S. PATENT DOCUMENTS

| | | | |
|---|---|---|---|
| 6,115,482 A | 9/2000 | Sears et al. | |
| 6,243,106 B1 | 6/2001 | Rehg et al. | |
| 6,303,924 B1 | 10/2001 | Adan et al. | |
| 6,317,130 B1 | 11/2001 | Ishikawa et al. | |
| 6,388,670 B2 | 5/2002 | Naka et al. | |
| 6,529,643 B1 | 3/2003 | Loce et al. | |
| 6,545,663 B1 | 4/2003 | Arbter et al. | |
| 6,554,706 B2 | 4/2003 | Kim et al. | |
| 6,657,670 B1 | 12/2003 | Cheng | |
| 6,674,877 B1 | 1/2004 | Jojic et al. | |
| 6,833,843 B2 | 12/2004 | Mojaver et al. | |
| 7,061,492 B2 | 6/2006 | Carrai et al. | |
| 7,061,532 B2 | 6/2006 | Silverstein | |
| 7,116,330 B2 | 10/2006 | Marshall et al. | |
| 7,123,292 B1 | 10/2006 | Seeger et al. | |
| 7,184,589 B2 * | 2/2007 | Okubo | 382/166 |
| 7,257,237 B1 | 8/2007 | Luck et al. | |
| 7,366,278 B2 | 4/2008 | Fu et al. | |
| 7,755,608 B2 * | 7/2010 | Chang et al. | 345/157 |
| 7,783,118 B2 * | 8/2010 | Zhou | 382/236 |
| 7,885,480 B2 * | 2/2011 | Bryll et al. | 382/278 |
| 7,903,141 B1 * | 3/2011 | Mariano et al. | 348/143 |
| 7,978,917 B2 * | 7/2011 | Lei et al. | 382/224 |
| 8,036,494 B2 * | 10/2011 | Chen | 382/299 |
| 8,094,943 B2 * | 1/2012 | Eaton et al. | 382/190 |
| 8,107,726 B2 * | 1/2012 | Xu et al. | 382/173 |
| 8,111,284 B1 | 2/2012 | Givon | |
| 8,114,172 B2 | 2/2012 | Givon | |
| 2001/0007452 A1 | 7/2001 | Naka et al. | |
| 2002/0191239 A1 | 12/2002 | Psaltis et al. | |
| 2003/0007680 A1 | 1/2003 | Iijima et al. | |
| 2004/0155962 A1 | 8/2004 | Marks | |
| 2004/0228530 A1 | 11/2004 | Schwartz | |
| 2005/0041842 A1 | 2/2005 | Frakes et al. | |
| 2005/0063596 A1 | 3/2005 | Yomdin et al. | |
| 2005/0166163 A1 | 7/2005 | Chang et al. | |
| 2005/0232514 A1 | 10/2005 | Chen | |
| 2005/0259870 A1 | 11/2005 | Kondo et al. | |
| 2006/0164230 A1 | 7/2006 | DeWind et al. | |
| 2006/0187305 A1 | 8/2006 | Trivedi et al. | |
| 2007/0098250 A1 | 5/2007 | Molgaard et al. | |
| 2007/0183633 A1 | 8/2007 | Hoffmann | |
| 2007/0236457 A1 | 10/2007 | Smyth | |
| 2007/0259717 A1 | 11/2007 | Mattice et al. | |
| 2007/0285419 A1 | 12/2007 | Givon | |
| 2007/0285554 A1 | 12/2007 | Givon | |
| 2008/0007533 A1 | 1/2008 | Hotelling | |
| 2008/0037869 A1 | 2/2008 | Zhou | |
| 2008/0101722 A1 | 5/2008 | Bryll et al. | |
| 2008/0111710 A1 | 5/2008 | Boillot | |
| 2008/0181499 A1 | 7/2008 | Yang et al. | |
| 2010/0066735 A1 | 3/2010 | Givon | |
| 2010/0111370 A1 * | 5/2010 | Black et al. | 382/111 |
| 2010/0194862 A1 | 8/2010 | Givon | |
| 2011/0080496 A1 | 4/2011 | Givon | |
| 2011/0129124 A1 | 6/2011 | Givon | |
| 2011/0163948 A1 | 7/2011 | Givon et al. | |
| 2011/0286673 A1 | 11/2011 | Givon et al. | |

FOREIGN PATENT DOCUMENTS

| | | |
|---|---|---|
| JP | 2004-062692 | 2/2004 |
| WO | WO 03/039698 | 5/2003 |
| WO | WO 2004/013814 | 2/2004 |
| WO | WO 2004/094943 | 11/2004 |
| WO | WO 2006/099597 | 9/2006 |
| WO | WO 2011/033519 | 3/2011 |

OTHER PUBLICATIONS

Cheung G K M et al., "Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

Theobalt C et al.,: "Enhancing silhouette-based human motion capture with 3D motion fields", Computer Graphics and Applications, 2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998 IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.

Sminchisescu et al. "Estimated Articulated Human Motion with Covariance Scaled Sampling". Published 2003.

Sappa et al. "Monocular 3D Human Body Reconstruction toward Depth Augmentation of Television Sequences". Published 2003.

Sminchisescu et al. "Human Pose Estimation from Silhouettes a Consistent Approach Using Distance Level Set". Published 2002.

\* cited by examiner

METHOD SYSTEM AND ASSOCIATED MODULES AND SOFTWARE COMPONENTS FOR PROVIDING IMAGE SENSOR BASED HUMAN MACHINE INTERFACING

FIELD OF THE INVENTION

The present invention relates generally to the field of human machine interfaces. More specifically, the present invention relates to methods systems and associated modules and software components for providing image sensor based human machine interfacing.

BACKGROUND

One of the largest patterns in the history of software is the shift from computation-intensive design to presentation-intensive design. As machines have become more and more powerful, inventors have spent a steadily increasing fraction of that power on presentation. The history of that progression can be conveniently broken down into three eras: batch (1945-1968), command-line (1969-1983) and graphical (1984 and after). The story begins, of course, with the invention of the digital computer. The opening dates on the latter two eras are the years when vital new interface technologies broke out of the laboratory and began to transform users' expectations about interfaces in a serious way. Those technologies were interactive timesharing and the graphical user interface.

In the batch era, computing power was extremely scarce and expensive. The largest and most powerful computers of that time commanded fewer logic cycles per second than a typical toaster or microwave oven does today, and quite a bit fewer than today's cars, digital watches, or cell phones. User interfaces were, accordingly, rudimentary. Users had to accommodate computers rather than the other way around; user interfaces were considered overhead, and software was designed to keep the processor at maximum utilization with as little overhead as possible.

The input side of user interfaces for batch machines were mainly punched cards or equivalent media like paper tape. The output side added line printers to these media. With the limited exception of the system operator's console, human beings did not interact with batch machines in real time at all.

Submitting a job to a batch machine involved, first, preparing a deck of punched cards describing a program and a dataset. Punching the program cards wasn't done on the computer itself, but on specialized typewriter-like machines that were notoriously bulky, unforgiving, and prone to mechanical failure. The software interface was similarly unforgiving, with very strict syntaxes meant to be parsed by the smallest possible compilers and interpreters.

Once the cards were punched, one would drop them in a job queue and wait. Eventually, operators would feed the deck to the computer, perhaps mounting magnetic tapes to supply another dataset or helper software. The job would generate a printout, containing final results or (all too often) an abort notice with an attached error log. Successful runs might also write a result on magnetic tape or generate some data cards to be used in later computation.

The turnaround time for a single job often spanned entire days. If one were very lucky, it might be hours; real-time response was unheard of. But there were worse fates than the card queue; some computers actually required an even more tedious and error-prone process of toggling in programs in binary code using console switches. The very earliest machines actually had to be partly rewired to incorporate program logic into themselves, using devices known as plugboards.

Early batch systems gave the currently running job the entire computer; program decks and tapes had to include what we would now think of as operating-system code to talk to I/O devices and do whatever other housekeeping was needed. Midway through the batch period, after 1957, various groups began to experiment with so-called "load-and-go" systems. These used a monitor program which was always resident on the computer. Programs could call the monitor for services. Another function of the monitor was to do better error checking on submitted jobs, catching errors earlier and more intelligently and generating more useful feedback to the users. Thus, monitors represented a first step towards both operating systems and explicitly designed user interfaces.

Command-line interfaces (CLIs) evolved from batch monitors connected to the system console. Their interaction model was a series of request-response transactions, with requests expressed as textual commands in a specialized vocabulary. Latency was far lower than for batch systems, dropping from days or hours to seconds. Accordingly, command-line systems allowed the user to change his or her mind about later stages of the transaction in response to real-time or near-real-time feedback on earlier results. Software could be exploratory and interactive in ways not possible before. But these interfaces still placed a relatively heavy mnemonic load on the user, requiring a serious investment of effort and learning time to master.

Command-line interfaces were closely associated with the rise of timesharing computers. The concept of timesharing dates back to the 1950s; the most influential early experiment was the MULTICS operating system after 1965; and by far the most influential of present-day command-line interfaces is that of Unix itself, which dates from 1969 and has exerted a shaping influence on most of what came after it.

The earliest command-line systems combined teletypes with computers, adapting a mature technology that had proven effective for mediating the transfer of information over wires between human beings. Teletypes had originally been invented as devices for automatic telegraph transmission and reception; they had a history going back to 1902 and had already become well-established in newsrooms and elsewhere by 1920. In reusing them, economy was certainly a consideration, but psychology and the Rule of Least Surprise mattered as well; teletypes provided a point of interface with the system that was familiar to many engineers and users.

The widespread adoption of video-display terminals (VDTs) in the mid-1970s ushered in the second phase of command-line systems. These cut latency further, because characters could be thrown on the phosphor dots of a screen more quickly than a printer head or carriage can move. They helped quell conservative resistance to interactive programming by cutting ink and paper consumables out of the cost picture, and were to the first TV generation of the late 1950s and 60s even more iconic and comfortable than teletypes had been to the computer pioneers of the 1940s.

Just as importantly, the existence of an accessible screen, a two-dimensional display of text that could be rapidly and reversibly modified made it economical for software designers to deploy interfaces that could be described as visual rather than textual. The pioneering applications of this kind were computer games and text editors; close descendants of some of the earliest specimens, such as rogue (6), and VI (1), are still a live part of UNIX tradition.

Screen video displays were not entirely novel, having appeared on minicomputers as early as the PDP-1 back in 1961. But until the move to VDTs attached via serial cables, each exceedingly expensive computer could support only one addressable display, on its console. Under those conditions it was difficult for any tradition of visual UI to develop; such interfaces were one-offs built only in the rare circumstances where entire computers could be at least temporarily devoted to serving a single user.

There were sporadic experiments with what we would now call a graphical user interface as far back as 1962 and the pioneering SPACEWAR game on the PDP-1. The display on that machine was not just a character terminal, but a modified oscilloscope that could be made to support vector graphics. The SPACEWAR interface, though mainly using toggle switches, also featured the first crude trackballs, custom-built by the players themselves. Ten years later, in the early 1970s these experiments spawned the video-game industry, which actually began with an attempt to produce an arcade version of SPACEWAR.

The PDP-1 console display had been descended from the radar display tubes of World War II, twenty years earlier, reflecting the fact that some key pioneers of minicomputing at MIT's Lincoln Labs were former radar technicians. Across the continent in that same year of 1962, another former radar technician was beginning to blaze a different trail at Stanford Research Institute. His name was Doug Engelbart. He had been inspired by both his personal experiences with these very early graphical displays and by Vannevar Bush's seminal essay As We May Think, which had presented in 1945 a vision of what we would today call hypertext.

In December 1968, Engelbart and his team from SRI gave a 90-minute public demonstration of the first hypertext system, NLS/Augment. The demonstration included the debut of the three-button mouse (Engelbart's invention), graphical displays with a multiple-window interface, hyperlinks, and on-screen video conferencing. This demo was a sensation with consequences that would reverberate through computer science for a quarter century, up to and including the invention of the World Wide Web in 1991.

So, as early as the 1960s it was already well understood that graphical presentation could make for a compelling user experience. Pointing devices equivalent to the mouse had already been invented, and many mainframes of the later 1960s had display capabilities comparable to those of the PDP-1. A very early video game in 1968, on the console of a Univac 1108 mainframe would cost nearly forty-five million dollars if you could buy it in 2004.

Video games became mass-market devices earlier than computers because they ran hardwired programs on extremely cheap and simple processors. But on general-purpose computers, oscilloscope displays became an evolutionary dead end. The concept of using graphical, visual interfaces for normal interaction with a computer had to wait a few years and was actually ushered in by advanced graphics-capable versions of the serial-line character VDT in the late 1970s.

Since the earliest PARC systems in the 1970s, the design of GUIs has been almost completely dominated by what has come to be called the WIMP (Windows, Icons, Mice, Pointer) model pioneered by the Alto. Considering the immense changes in computing and display hardware over the ensuing decades, it has proven surprisingly difficult to think beyond the WIMP—although a few attempts have been made—perhaps the boldest of which is in VR (virtual reality) interfaces. VR users move around and gesture within immersive graphical 3-D environments. VR has attracted a large research community since the mid-1980s. A fundamental problem, familiar for many years to designers of flight simulators, is the way VR can confuse the human proprioceptive system; VR motion at even moderate speeds can induce dizziness and nausea as the brain tries to reconcile the visual simulation of motion with the inner ear's report of the body's real-world motions.

Jef Raskin's THE project (The Humane Environment) is exploring the zoom world model of GUIs. In THE, the screen becomes a window on a 2-D virtual world where data and programs are organized by spatial locality. Objects in the world can be presented at several levels of detail depending on one's height above the reference plane, and the most basic selection operation is to zoom in and land on them.

The Lifestreams project at Yale University goes in a completely opposite direction, actually de-spatializing the GUI. The user's documents are presented as a kind of world-line or temporal stream which is organized by modification date and can be filtered in various ways.

All three of these approaches discard conventional file systems in favor of a context that tries to avoid naming things and using names as the main form of reference. This makes them difficult to match with the file systems and hierarchical namespaces of UNIX's architecture, which seems to be one of its most enduring and effective features. Nevertheless, it is possible that one of these early experiments may yet prove as seminal as Engelhard's 1968 demo of NLS/Augment.

Considerable efforts are being made to enable image or video based human machine interfacing, where the machine (i.e. computing device) is able to interpret a user's gestures as input commands. However, the technologies for doing so, and the field as a whole is still in its infancy. There is a need in the field of user interfaces for an improved system and method for a Human-Machine-Interface.

The Applicant of the present application has filed patent applications Nos. U.S. Ser. No. 11/572,958, filed 30 Jan. 2007, entitled "A SYSTEM AND METHOD FOR 3D SPACE-DIMENSION BASED IMAGE PROCESSING"; U.S. Ser. No. 11/277,578 filed 27 Mar. 2006, entitled "APPARATUS METHOD AND SYSTEM FOR IMAGING"; U.S. Ser. No. 12/517,210 filed 2 Jun. 2009, entitled "AN APPARATUS SYSTEM AND METHOD FOR HUMAN-MACHINE-INTERFACE"; PCT/IL 2009/000862, filed 6 Sep. 2009, entitled "A METHOD SYSTEM AND ASSOCIATED MODULES AND SOFTWARE COMPONENTS FOR PROVIDING IMAGE SENSOR BASED HUMAN MACHINE"; U.S. 61/244,136, filed 21 Sep. 2009, entitled "METHOD CIRCUIT AND SYSTEM FOR HUMAN MACHINE INTERFACING WITH AN ELECTRONIC DEVICE", each of which relate to aspects of proving image/video based human machine interfaces. The teachings of each of the above referenced applications is hereby incorporated by reference into the present application.

SUMMARY OF THE INVENTION

The present invention is a method, system and associated modules, software components and processing units for providing image (sensor) based human machine interfacing ("IBHMI"). According to some embodiments of the present invention, an IBHMI may be comprised of an image acquisition device or assembly and a processing unit which may derive an estimated user body position a set of estimated user body positions or a body movement. As a step in deriving same, the processing unit may classify one or more groups of pixels (e.g. blocks of pixel or pixel groups) of an image or video frame as either background or foreground. According to further embodiments of the present invention, a processing unit may perform classification of pixels or pixel groups as background or foreground outside the context of deriving an estimated user body position, a set of estimated user body positions or a body movement.

According to some embodiments of the present invention, there may be provided an image processing system including an image processing unit adapted to receive one or more images of a scene acquired by an imaging assembly and to classify a first pixel group of at least one of the one or more images as background or foreground. Pixel group classification performed by the processing unit may be at least partially based on a relative position between the first pixel group and at least one other previously classified pixel group in the same or another frame. The processing unit may also factor into a classification process whether the first pixel group is within a defined spatial proximity with the at least one other previously classified pixel group. The processing unit may compare at least one visual attribute of the first pixel group against corresponding visual attributes of the at least one other previously classified pixel group(s).

According to further embodiments of the present invention, the processing unit may determine whether the first pixel group is located within a region between at least two other previously classified pixel groups, and may compare at least one visual attribute of the first pixel group against corresponding visual attributes of the at least two other previously classified pixel groups. The processing unit may be further adapted to classify the first pixel group at least partially based on a spatiotemporal deviation value between the first pixel group and a corresponding pixel group in another frame.

According to some embodiments of the present invention, the processing unit may be adapted to classify the first pixel group as foreground when the at least one other previously classified pixel group(s) is classified as foreground. The at least one other previously classified pixel group may be classified as foreground because of an associated spatiotemporal deviation value being above a threshold. The at least one other previously classified pixel group may be classified as foreground based on a feature detection algorithm (e.g. face, hands, etc.).

According to some embodiments of the present invention, there may be provided an image based human machine interface including an image acquisition assembly adapted to acquire a set of two-dimensional images of a user, wherein substantially two or more images are each associated with a different point in time; and a processing unit adapted to derive one or more estimated user body positions in part by classifying one or more pixel groups as background or foreground. The processing unit may be adapted to measure a spatiotemporal deviation value ("SDV") of a first pixel group in a first frame, which SDV is indicative of spatiotemporal deviation between the first pixel group in a first frame and a corresponding second pixel group in another frame, and to classify the pixel group as either background or foreground at least partially based on the SDV of the pixel group and based on a spatial relation between the pixel group and at least one other previously classified pixel group.

According to some embodiments of the present invention, an SDV of a given pixel group measured/detected above a threshold may result in the given pixel group being classified as foreground unless the SDV is also characterized as the result of a High SDV Background Exception ("HSBE"). An HSBE may be one or more phenomenon selected from the group consisting of: static motion in the frame, dynamic motion in the frame, non-unified motion in the frame, unified motion in the frame, a shift in the image acquisition assembly and a lighting shift. A pixel group whose SDV is characterized as a result of a lighting shift may not be classified or reclassified. A pixel group whose SDV is characterized as a result of a shift in the image acquisition assembly may trigger the processing unit to reinitiate background classification processing. A pixel group whose SDV is characterized as a result of a shift in the image acquisition assembly may trigger the processing unit to perform pixel offset compensation based on a detected change of position of said image acquisition assembly. Pixel offset compensation may include correlation of pixel group data associated with a first assembly position with a second assembly position.

According to some embodiments of the present invention an SDV of a given pixel group measured/detected below a threshold may result in the given pixel group being classified as background unless the SDV is characterized as the result of a Low SDV Foreground Exception ("LSFE"). An LSFE may be one or more phenomenon selected from the group consisting of a shift in the image acquisition assembly, a lighting shift, a near predefined element exception and a near foreground exception. The processing unit may be adapted to classify a first pixel group as foreground when a second pixel group is characterized as foreground and the first pixel group and the second pixel group both have one or more similar traits or visual attributes (e.g. near foreground exception). The processing unit may be adapted to classify a first pixel group as foreground when a second pixel group is consistent with a predefined element or feature and the first pixel group and the second pixel group are within a predefined proximity of one another (e.g. near element/feature exception).

According to some embodiments of the present invention, there may be provided an image processing method including the step of acquiring a set of two-dimensional images of a user, wherein substantially each image is associated with a different point in time, and classifying one or more pixel group(s) as background or foreground. Classifying may include measuring a spatiotemporal deviation value ("SDV") of a first pixel group in a first frame, which SDV is indicative of spatiotemporal deviation between the first pixel group in a first frame and a corresponding second pixel group in another frame. Classifying a pixel group as either background or foreground may at least partially be based on the measured SDV of the pixel group and a spatial relationship between the pixel group and at least one other previously classified pixel group.

According to some embodiments, detection of an SDV of a given pixel group above a threshold may result in the given pixel group being classified as foreground unless the SDV is characterized as the result of a High SDV Background Exception ("HSBE"). An HSBE may be one or more phenomenon selected from the group consisting of: static motion in the frame, dynamic motion in the frame, non-unified motion in the frame, unified motion in the frame, a shift in the image acquisition assembly and a lighting shift.

Detection of an SDV of a given pixel group below a threshold may result in the given pixel group being classified as background, unless the SDV is characterized as the result of a Low SDV Foreground Exception ("LSFE"). An LSFE may be one or more phenomenon selected from the group consisting of a shift in the image acquisition assembly, a lighting shift, a near predefined element exception and a near foreground exception.

A near foreground exception is detected when a second SDV associated with a second pixel group is characterized as foreground and the first pixel group and the second pixel groups are within a predefined proximity and both have one or more similar traits. A near predefined element exception may be detected if a second pixel group is consistent with a predefined element/feature and the first pixel group(s) and the second pixel group(s) are within a predefined proximity.

According to some embodiments of the present invention, the processing unit may engage in an initialization phase, during which initialization phase groups of pixels from a first set of frames may be initially classified as background or foreground. Initial classification may be in accordance with an XTR skeleton initialization process or may use additional information to estimate the foreground. The processing unit may further update and improve initial classification of background and foreground. For example, certain element characterizations complying with a face or head may be detected, a large moving unified object may be detected or pixel groups classified as edges or other.

According to some embodiments of the present invention, the processing unit may gather, process and/or calculate information regarding a pixel group by detecting one or more deviation values between a group of pixels and one or more additional groups of pixels in the same frame within a predefined proximity. The same frame deviation value ("SFDV") may detect deviation in color, shade, texture, granularity or other and a pixel group may have several such SFDVs.

According to some embodiments of the present invention, the processing unit may identify if there has been a change in the pixels of a frame compared to corresponding pixels of a frame taken at an earlier time (meaning, a change in the pixels of a frame in the time domain). A value may be calculated or detected such as a spatiotemporal deviation value ("SDV"). The processing unit may then characterize the change or lack of change and optionally with more information, classify one or more pixels as background or foreground. According to some embodiments of the present invention, if the SDV value is higher than a threshold, the pixel group that the SDV is associated with may be classified as foreground unless a high SDV background exception is concurrently detected—for example, there is an indication that a change in an image acquisition assembly position has occurred, or there is a change in lighting.

According to some embodiments of the present invention, if the SDV value is lower than a threshold, the pixel group that the SDV is associated with may be classified as background unless a low SDV foreground exception is concurrently detected, for example, if there is spatial proximity and feature/attribute proximity (color, texture, etc.) between the pixel group and another pixel group in the same frame which is already classified as foreground. A further example of a low SDV exception which may lead to a pixel group associated with a low SDV being classified as foreground is when the pixel group is located between two or more pixel groups which, although not having similar features or attributes to the pixel group, are already classified as foreground. For example, a pixel group with a low SDV may be on a black shirt located in the middle of a human torso, and pixel groups on the edges of the torso may be identified as foreground based on any technique such as edge detection, feature (i.e. face, arms, etc.) detection, skeleton fitting, or any other technique known today or to be devised in the future.

According to some embodiments of the present invention, the pixel group(s) may be classified as background or foreground according to SDV and/or SFDV and/or calculations, characterizations or additional information stemming from the combination of several such deviation values. According to some embodiments of the present invention, a pixel group may be divided into more pixel groups if required. For example, if a group of pixels is detected as the edge between background and foreground then the pixel group may be split into two or more pixel groups in order to allow a higher definition of the edge, faster tracking of that area and more.

According to some embodiments of the present invention, if the processing unit identifies a change in a pixel group of a frame in the time domain, either higher or lower than a threshold value, then it may classify the change as a light change which may appear in large areas of the image and/or may consist of a slight change in the pixels which may correlate to a change of shade as opposed to movement. The processing unit may update the pixels with the change of shade while the classification of background/foreground remains the same as in the previous time slot.

According to some embodiments of the present invention, if the processing unit identifies a SDV higher than a threshold value, then it may classify the change into groups such as: a change associated with static movement (such as a chair that is moved), unified dynamic movement (such as a moving human being) or non-unified dynamic movement (such as a flashlight being turned on or off) and more. The processing unit may then classify the pixels as background or foreground depending on specific functional application definitions. For example, in an embodiment moving a chair may be considered background while in another embodiment the chair is a user and may be classified as foreground when it enters or moves in the frame.

A shift in the image acquisition device position, may be manifested as substantial changes in large portions of the frame. The processing unit may then reset the dynamic data set—starting the process of building the data set from the beginning. Alternately, the processing unit may calibrate the previous information of the image to the new position of the image acquisition device and continue with the process of determining if the pixel is background or foreground, or the processing unit may return the image acquisition device to its original position and acquire the image again.

According to some embodiments of the present invention, the image acquisition device may be a mobile image acquisition device (for example, a cell phone camera, a camera upon a flying plane or a video camera) and it is not expected to remain stationary or immobile. The processing unit may relay, acquire or analyze data regarding position of image acquisition device and may further align or correlate subsequent images and further use the information for edge detection or classifying one or more groups of pixels as foreground and background. For example, an image that has be initialized and its pixel groups have already been classified as background or foreground may use that information and additional new information such as SDV and/or SFDV in order to classify one or more groups of pixels as background (which may have substantially larger deviations than pixel groups which are foreground).

According to some embodiments of the present invention, pixel groups classified as background may be analyzed as 2D or 3D video information. Pixel groups classified as foreground may be analyzed as 2D or 3D video information. According to some embodiments of the present invention, if the processing unit does not identify a change in the pixels of a frame in the time domain then it may classify the pixels as background. However, if the pixels are in predefined proximity to pixels that have changed then the processing unit may characterize them according to the neighboring pixels (for example, static dynamic etc.) and further classify them as foreground or background accordingly. Furthermore, if the pixels are in a predefined proximity to pixels predefined as foreground then they may not be defined as background as well.

According to some embodiments of the present invention, one or more pixel groups may be classified as edge of foreground. The edge may be classified according to characterization of the edge, characterization of the foreground, SDV and/or SFDV. The processing unit may then classify the remaining pixel groups as background or foreground according to their position and characterization with relation to the edge pixel group(s) or may classify them as "not edge". For example, the edge pixel groups may be characterized with specific contrasts of color between them, certain texture, certain density or other, this information may be compared to information of other pixel groups and they can be classified accordingly. Information regarding characterization may be updated in subsequent frames to account for changes in shading, texture, density or other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:—

Figure 1A:
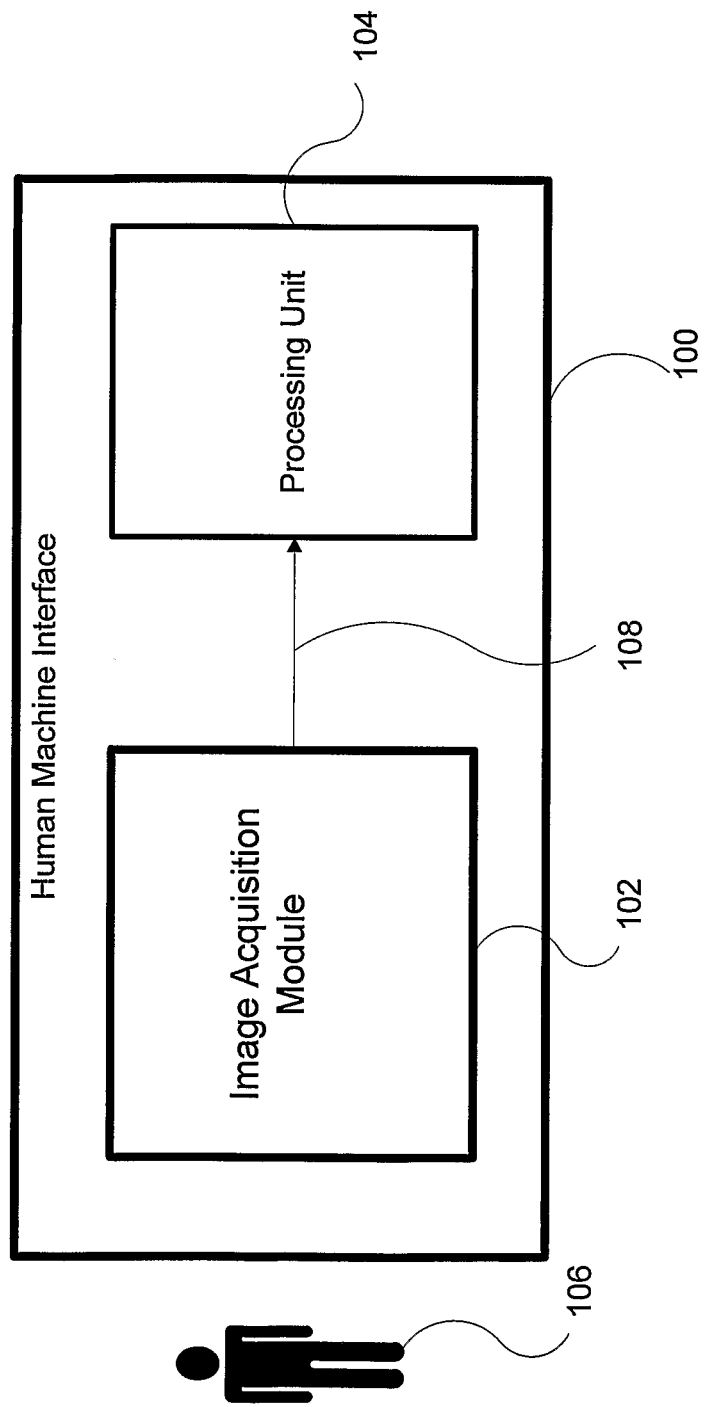
FIGS. 1A & 1B show block diagrams of image based human machine interface ("HMI") systems.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to some embodiments of the present invention, there is provided an image based human machine interface including an input adapted to receive a set of two-dimensional images of a user, wherein substantially two or more images are each associated with a different point in time. A processing unit may be adapted to derive one or more estimated user body positions by classifying one or more pixel groups in one or more of the images as background or foreground. The processing unit may measure a spatiotemporal deviation value ("SDV") of a first pixel group in a first frame, which SDV is indicative of spatiotemporal deviation between the first pixel group in a first frame and a corresponding second pixel group in another frame. Classification of a pixel group as either background or foreground may be at least partially based on an SDV value of the pixel group and the pixel group's spatial relationship to previously classified pixel groups. An SDV of a given pixel group being above a threshold may result in the given pixel group being classified as foreground unless the SDV is characterized as the result of a High SDV Background Exception ("HSBE"). An SDV of a given pixel group detected below a threshold may result in the given pixel group being classified as background, unless the SDV is characterized as the result of a Low SDV Foreground Exception ("LSFE").

Turning now to FIG. 1A there is shown an image based human machine interface system, such as system 100. System 100 may be able to acquire an image and decide, identify or classify objects or pixel groups within the frame as background or foreground. System 100 may be comprised of an image acquisition assembly, such as image acquisition module 102 and a processing unit such as processing unit 104.

Image acquisition module 102 may acquire an image (such as image 106) which may be, for example, one or more people, a room, an object such as a chair or medical device, an animal, scenery or any other subject matter. Image acquisition module 102 may be a digital camera, a video camera, an analog camera, a multimedia module and more. Image acquisition module may output an acquired image to processing unit 104 by an input such as input 108. Input 108 may be a video file, a picture file, a multimedia file, a binary string or any other form of data and may depict a 2D or 3D image. Processing unit 104 may receive one or more acquired images such as input 108 and may derive one or more estimated user body positions by classifying one or more groups of pixels as background (for example, items, people, objects that are not of interest to the HMI or that the HMI may not need to track their movement, or may need to track their movement at a lower rate or frequency) or foreground (for example: items, people, objects that may be of interest and the HMI may follow their movements). Processing unit 104 and image acquisition module 102 may be on a common or shared module or may be on separate or detached units and communicate input 108 via wireless communication or wired cables.

According to some embodiments of the current invention, processing unit 104 may be adapted to detect a spatiotemporal deviation value ("SDV"), a difference in time between a first pixel group and a second pixel group associated with image 106. According to some embodiments of the present invention, if the SDV is lower than a threshold the group of pixels associated with the SDV may be classified as background unless the group of pixels is characterized as a Low SDV Foreground Exception ("LSFE"). Examples of LSFE characterizations may be: a movement in acquisition device, a change in lighting, a near predefined element exception (for example, if the pixel group is near an element predefined as important like a head or face or part of a detected XTR skeleton) and a near foreground exception (for example, if the pixel group is near another pixel group classified as foreground that have similar traits such as color, shade, texture or other).

According to some embodiments of the present invention, if the SDV is higher than a threshold the group of pixels associated with the SDV may be classified as foreground unless the group of pixels is characterized as a High SDV Background Exception ("HSBE"). Examples of HSBE characterizations may be: a movement in acquisition device, a change in lighting, static motion, dynamic unified motion and dynamic non-unified motion.

Processing unit 104 may take additional information, such as additional pixels groups within a predefined proximity and their SDV, color or traits, in order to characterize and subsequently classify the groups of pixels and/or SFDV.

Processing unit 104 may classify one or more pixel group(s) as edge or non-edge pixel groups. Classification may be according to SDV and/or SFDV and additional information such as characterization of expected or previously detected edge pixels (color, texture, rigidness, contrast and more). Processing unit 104 may further split or divide the pixel group(s) into smaller groups in order to improve, fasten or make more accurate edge detection. Processing unit 104 may use classification of pixel groups as edge or non-edge to further classify additional pixel groups as foreground or background according to their proximity to one or more edge pixel groups, SDV, SFDV and additional information such as color, texture, shade, rigidness and more of the pixel group.

According to some embodiments of the present invention, if a group of pixels relating to a SDV are characterized as a movement or change in position of acquisition module 102 (for example, a movement in placement or in direction, angle or perspective or other) processing unit 104 may restart, re-initiate or reboot; for example, the image may be reacquired or previous data deleted. Alternatively, in some embodiments of the present invention, the previous data associated with the acquisition module 102 in its first position may be calibrated, harmonized or perform pixel offset compensation in order to match, correspond or be compatible with the new position of acquisition module 102.

According to some embodiments of the present invention, if image acquisition module 102 is a mobile module then processing unit 104 may relay, acquire or analyze data regarding position of image acquisition module 102 and may further align or correlate subsequent images and further use the information for edge detection or classifying one or more groups of pixels as foreground and background. For example, an image that has been initialized and its pixel groups have already been classified as background or foreground may use that information and additional new information such as SDV and/or SFDV in order to classify one or more groups of pixels as background (which may have substantially larger deviations than pixel groups which are foreground), foreground, edge, and/or non-edge pixel groups.

According to some embodiments, if the SDV is classified as substantially no change or no movement in a pixel group associated with image 106, processing unit 104 may classify the group of pixels as background or foreground according to a second pixel group in a predefined proximity, if the second pixel group a close enough shade and movement has been detected in association with them. Processing unit 104 may classify a first pixel group associated with image 106, as foreground, even if no deviation or movement has been detected if a third pixel group in a predefined proximity of the first pixel group is classified as foreground or as a predefined group of special or unique pixels. According to some embodiment of the present invention, processing unit 104 may classify a pixel group as background if SDV is characterized as no movement or if SDV is lower than a threshold value.

Figure 1B:
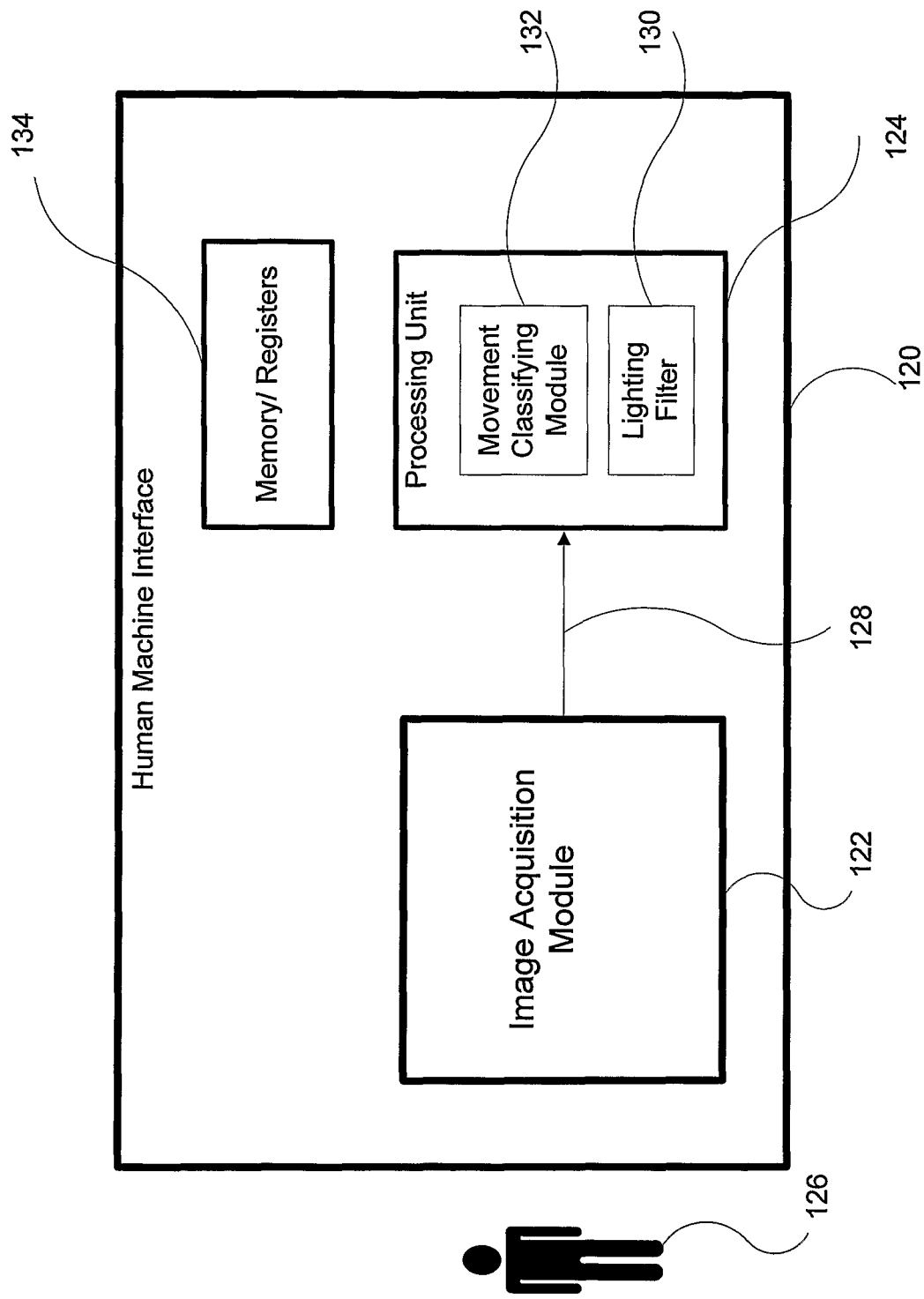

Turning now to FIG. 1B, there is shown an image based human machine interface system, such as system 120. It is understood that items 120-128 may essentially be the same and have the same functionalities as corresponding blocks 100-108 of FIG. 1B. Processing unit 124 may further comprise a lighting filter such as lighting filter 130 which may be able to identify when a deviation in one or more groups of pixels is associated in a change of lighting, such as movement of clouds in sky, dimming of a lighting apparatus or other. Lighting filter 130 may be embedded in the processing unit 124 or may be a separate unit or apparatus capable of communication with processing unit 124. Processing unit 124 may further comprise a movement classifying module, such as movement classifying module 132 which may classify movement into a predetermined classification of movement, such as static, dynamic, unified, non-unified, a combination of these groups or other. Processing unit 124 may further classify one or more groups of pixels according to classification of movement determined by movement classifying module 132. Movement classifying module 132 may be embedded in the processing unit 124 or may be a separate unit or apparatus capable of communication with processing unit 124.

According to some embodiments of the present invention, system 120 may further comprise a memory or one or more registers, such as memory 134 adapted to store information regarding one or more groups of pixels, their movement classification and/or their classification as background, foreground or other. A pixel group may comprise one or more pixels and may comprise several pixel groups within a larger pixel group so that information is saved regarding the group and internal pixel groups as well. Memory 134 may store additional information associated with one or more groups of pixels such as the time or order of the pixels or the location or position of the pixels within a frame. Memory 134 may be embedded within the system or may be a separate unit capable of inputting and outputting data to the processing unit. According to some embodiments of the present invention, memory 134 may an integral part of processing unit 124.

Figure 5:
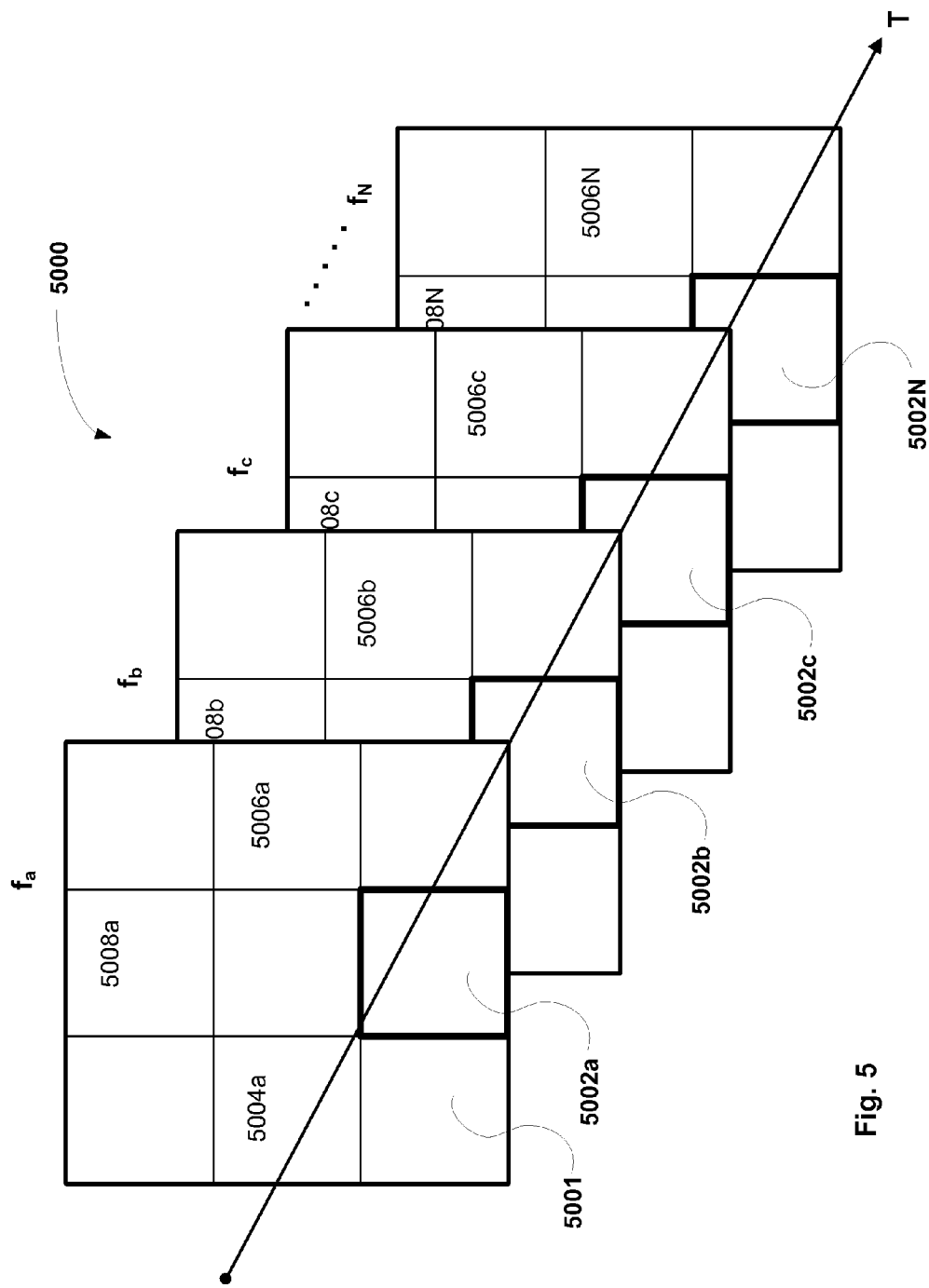
FIG. 5 shows a group of frames.

Turning now to FIG. 5, there is shown a group of frames such as frame group 5000. Frames $f_a$, $f_b$, $f_c$, through $f_N$, depict frames acquired by an image receiving device or image acquisition device or assembly. The frames may represent an image that may change in time such that the frames $f_a$, $f_b$, $f_c$, through $f_N$, may represent different images captured along a timeline T. (Note: frame $f_N$ is marked with uppercase letter N so as to depict that it is any number of frames after from $f_c$ and not necessarily 11 frames after frame $f_c$). Frame $f_a$ and all the subsequent frames are divided into different pixel groups such as pixel groups 5001 and 5002 which cover different areas of the frame of a captured image. Pixel groups 5001*a* and 5002*a* may be of the same size or different sizes. Throughout the frames $f_a$, $f_b$, $f_c$, through $f_N$ pixel groups 5002*a*, 5002*b*, 5002*c* and 5002N are corresponding pixel groups which may capture the same area in a changing captured image. Corresponding pixel blocks within the frames may be defined as blocks in the same location of the frames (e.g. 5001*a* and 5001*b*, 5001*b* and 5001*d*, etc.). A spatiotemporal deviation value ("SDV") may be calculated, detected or processed according to the differences between one or more of the corresponding pixels groups such as 5002 (5002*a* to 5002*b*, and 5002*b* to 5002*c*, etc.), 5004 (5004*a* to 5004*b*, and 5004*b* to 5004*c*, etc.), 5006 (5006*a* to 5006*b*, and 5006*b* to 5006*c*, etc.) and 5008 (5008*a* to 5008*b*, and 5008*b* to 5008*c*, etc.). For example, a first SDV may be detected by comparing pixel group 5002*a* and 5002*b* and a second SDV may be detected by comparing pixel group 5005*b* and 5005*c*.

Figure 2A:
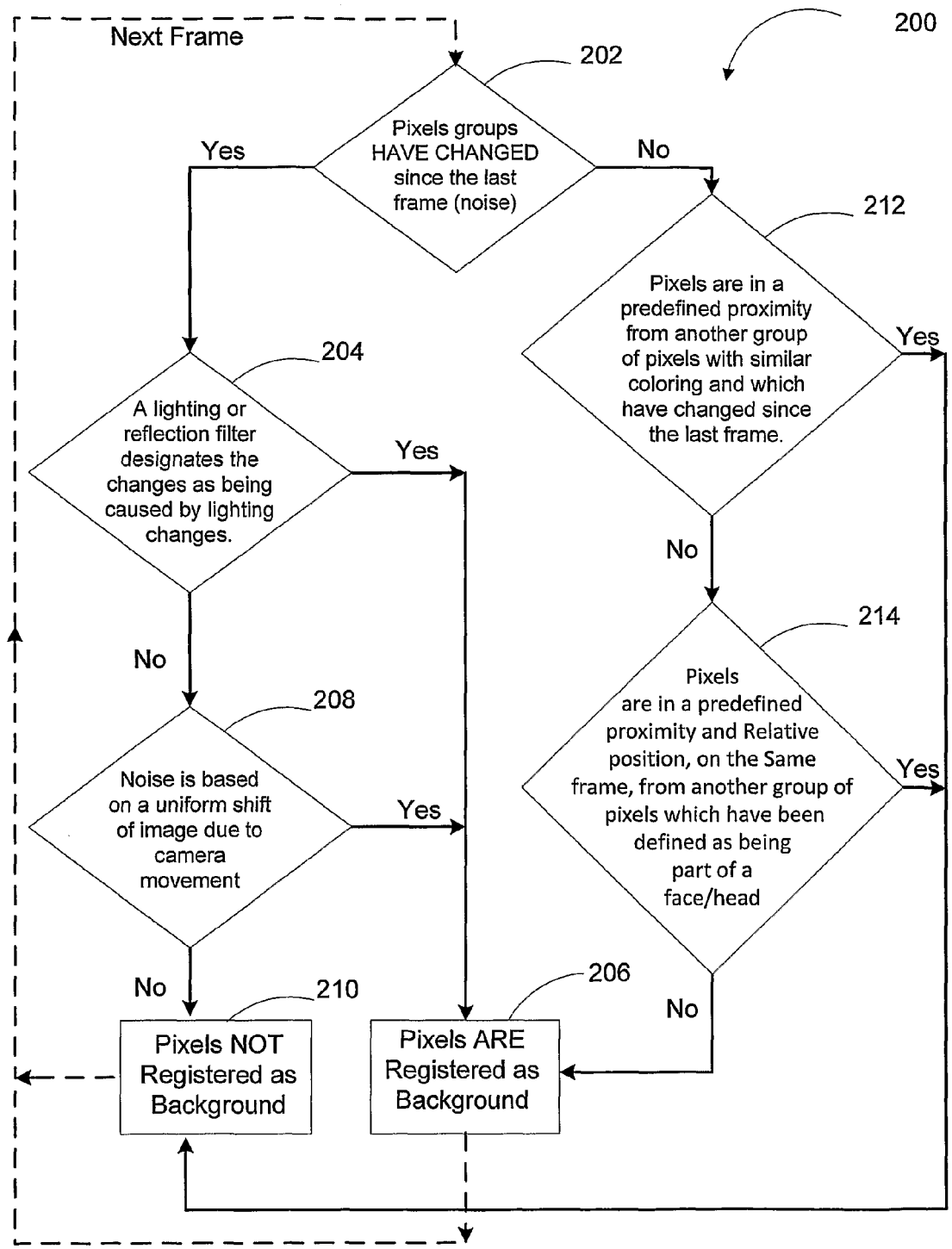
FIGS. 2A & 2B show flow charts of a processing unit.

Turning now to FIG. 2A, there is shown a processing unit flow chart as seen in flow chart 200. According to some embodiments of the present invention, a processing unit which has previously received one or more groups of pixels may detect if there has been movement in those pixel groups compared to other pixel groups received at a previous time or space as described in step 202. The movement may also be called noise (which should not be confused with the term noise which may mean an unwanted interference or obstruction of data or signal or image and more). If there has been a deviation then the processing unit may continue to classify if the movement is correlated with a change in lighting (for example: if the image was previously lit by an open window on a sunny day and clouds have rolled in then there may be a change of lighting, or if a frame was lit by a light fixture and in a subsequent frame the lighting was dimmed or other). Classification may be implemented by a filter as described in step 204. If the deviation detected is indeed classified as a change in lighting and not movement of the image or a pixel group associated with the image, then the processing unit may classify the pixel group(s) as background as shown in step 206.

If the deviation is not characterized as a change in lighting then the processing unit may then detect if the deviation is due to a movement of an acquisition module and not movement of the image as shown in step 208. If deviation is indeed characterized as a movement in the acquisition module then the processing unit may then classify the pixels as background as shown in step 206. If the deviation is not characterized as a movement in position of the acquisition module then the processing unit may then classify the pixels not as background (for example: as foreground, or registered as pixels that need to be reanalyzed and more) as shown in step 210. If no deviation was detected or a very small deviation, or a deviation lower than a threshold value, which may be characterized as no substantial change between pixels as described in step 202 then the processing unit may detect, compute or analyze if the pixel group(s) are within a predefined proximity of another pixel group(s) that have a similar trait(s) such as coloring, shading, contrast or other and have changed as described in step 212. Such an implementation may detect pixel groups that have not changed but are foreground. For example, if an object is depicted within several pixel groups, even though the object is moving some of the SDVs associated with some of the pixel groups may be below a threshold value since another area of the same object takes up the pixel group. Therefore additional information on neighboring pixel group(s) may help in defining several pixel groups as foreground although a change in pixels may only be detected in some of them (for example—the edges of the object).

If the pixel groups meet the requirements according to step 212 then the pixel groups may not be classified as background as shown in step 210. If the pixel groups do not meet the requirements according to step 212 then the processing unit may further detect, compute or analyze if the pixel groups are within a predefined proximity or within the same frame as a special object or a predefined element, object or user (for example: a head, a face, a chair, XTR Skeleton and more) as described in step 214. The predefine element may be of higher interest to an application associated with the HMI system, for example: when tracking a person the head or face may be a predefined element. Another example may be: when using in medical implementations, a scalpel or other medical device may be predefined as an element of interest. If the pixel groups meets the requirements of step 214 then the processing unit may classify the pixels not as background—as shown in step 210. If the pixel group does not meet the requirement of step 214 then the processing unit may classify the pixels as background—as shown in step 206. Optionally, when the processing unit concludes classifying if a pixel groups is background or not (as shown in steps 206 and 210) it may continue to receive the next frame and compare a new group(s) of pixels to the previously analyzed pixels and restart the whole previously described process starting detecting if there has been a deviation in the pixels between the previous frame and the new frame as seen in step 202. According to some embodiments of the present invention, some or all of the stages may be done in parallel on the same frame or pixel groups or may be carried out on several frames in parallel, or a combination of parallel and serial functions.

Figure 2B:
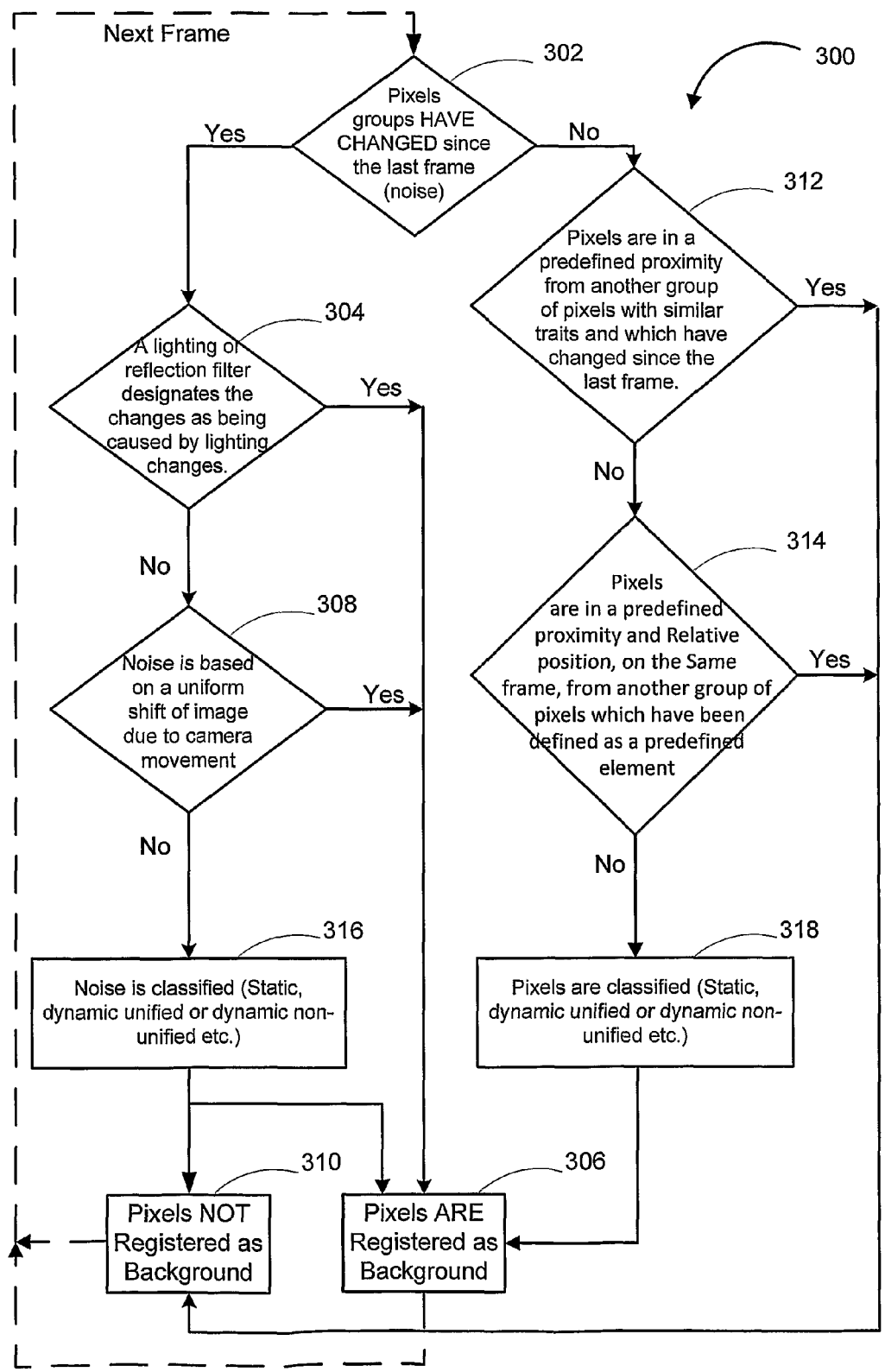

Turning now to FIG. 2B there is shown a processing unit flow chart as seen in flow chart 300. If the pixel groups meet the requirements according to step 312 then the pixel groups may not be classified as background as shown in step 310. If the pixel groups do not meet the requirements according to step 312 then the processing unit may further detect, compute or analyze if the pixel groups are within a predefined proximity or within the same frame as a special object or a predefined element, object or user (for example: a head, a face, a chair, XTR Skeleton and more) as described in step 314. The predefine element may be of higher interest to an application associated with the HMI system, for example: when tracking a person the head or face may be a predefined element. Another example may be: when using in medical implementations, a scalpel or other medical device may be predefined as an element of interest. If the pixel group meets the requirements of step 314 then the processing unit may continue to characterize the pixel groups as described in step 316. If the pixel group does not meet the requirement of step 314 then the processing unit may classify the pixels as background—as shown in step 306. Optionally, when the processing unit concludes classifying if a pixel group(s) is background or not (as shown in steps 306 and 310) it may continue to receive the next frame and compare a new group(s) of pixels to the previously analyzed pixels and restart the whole previously described process starting with detecting if there has been a deviation in the pixels between the previous frame and the new frame as seen in step 302. According to some embodiments of the present invention, some or all of the stages may be done in parallel on the same frame or pixel groups or may be carried out on several frames in parallel, or a combination of parallel and serial functions.

If a change in pixels was detected and it is not characterized as a change in lighting (as described in step 304) or a change in position of the image acquisition module (as described in step 308) then the processing unit may analyze which group of movements the movement belongs to for example: static, dynamic unified or dynamic non-unified and more as described in step 316. Following step 316 the group(s) of pixels may be classified as either background or not background according to the group of movements the pixels belong to as described in steps 306 and 310. The definition which group (static, dynamic etc.) belongs to which classification (background, not background or other) depends on the application and its definitions and may be predefined per application or system that the HMI system is running on or correlated to.

According to some embodiments of the present invention, movement defined as "static" (described in step 312) may be changing location of an inanimate object such as a chair, a desk, a bottle or other wherein the movement of the object may create two new areas of information—one where the object used to be and the other the new position of the object. According to some embodiments of the present invention, dynamic unified movement (described in step 312) may be movement of a person, a rolling ball, a dog or other wherein the movement may be an on-going process or continuous function—for example the rolling ball may move continuously throughout several frames. According to some embodiments of the present invention, dynamic non-unified movement (described in step 312) may be a change in a part of the picture due to slight movement in a curtain also causing shade in a part of the frame, a watch or jewelry that may cause shining in a part of the frame or a flickering light and more. The dynamic non-unified movement may be similar to light changes in the frame however in these cases the change in the frame may be in a limited area while a general change in lighting may be in a large part of the frame.

Figure 3A:
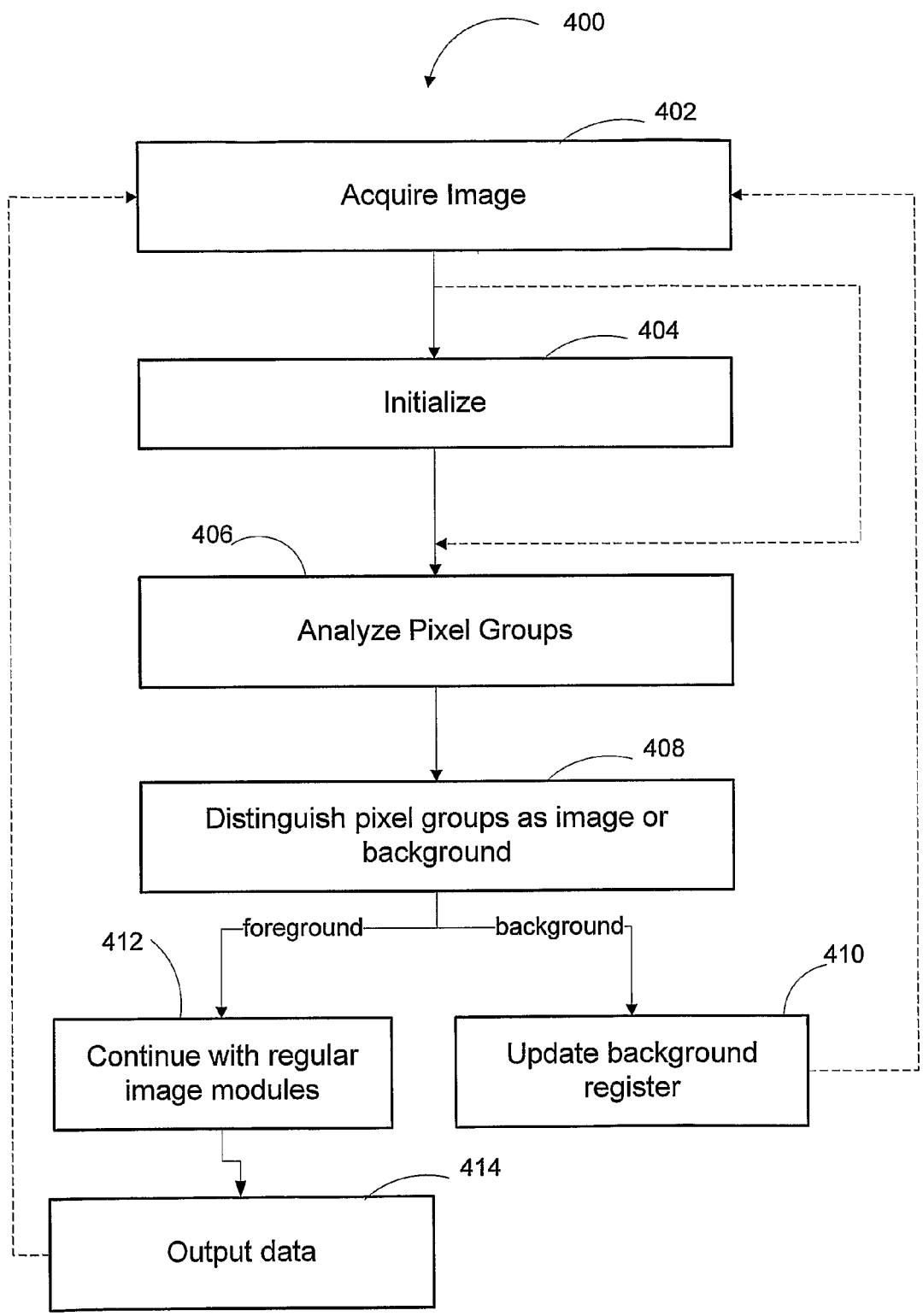
FIGS. 3A, 3B & 3C show a flow chart of an HMI system.

Turning now to FIG. 3A there is shown a HMI system flow chart as seen in flow chart 400. The HMI system may acquire an image as shown in step 402. The image may be comprised of one or more frames and each frame may be comprised of one or more pixel groups. After acquiring the image the system may either initialize as shown in step 404 (for example, if it is a first image being acquired, or after a predetermined number of cycles of acquiring images or other). Step 404 may include deleting previously saved information in registers, data storage or memory and any other function that needs to be carried out the first time an image is received or once every several cycles. Following this step the system may analyze the pixel groups as shown is step 406. Step 406 may include detecting SDV, SFDV, characteristics of pixel groups and additional information derived from some or all these and more. Optionally, if not in an initial cycle or other predefined parameter the system may skip step 404 and go directly between steps 402 and 406 as shown in the flow chart. The system may then distinguish if the pixels should be distinguished as background or foreground as shown in step 408. If the pixels are distinguished as background the system may save them in the memory as background (as shown in step 410)—this may contribute to speed at which the system can operate and the accuracy of the system. If the pixels are distinguished as foreground (meaning parts of the image that are of interest to an application) then the system may continue regular image modules (as shown in step 412) such as XTR 3D Motion Capture Engine, storing the movement, error correction, tracking and more. The system may then output the data regarding the user's movements as shown in step 414. Following steps 414 and step 410 the system may optionally acquire an additional image and restart the steps described above.

Figure 3B:
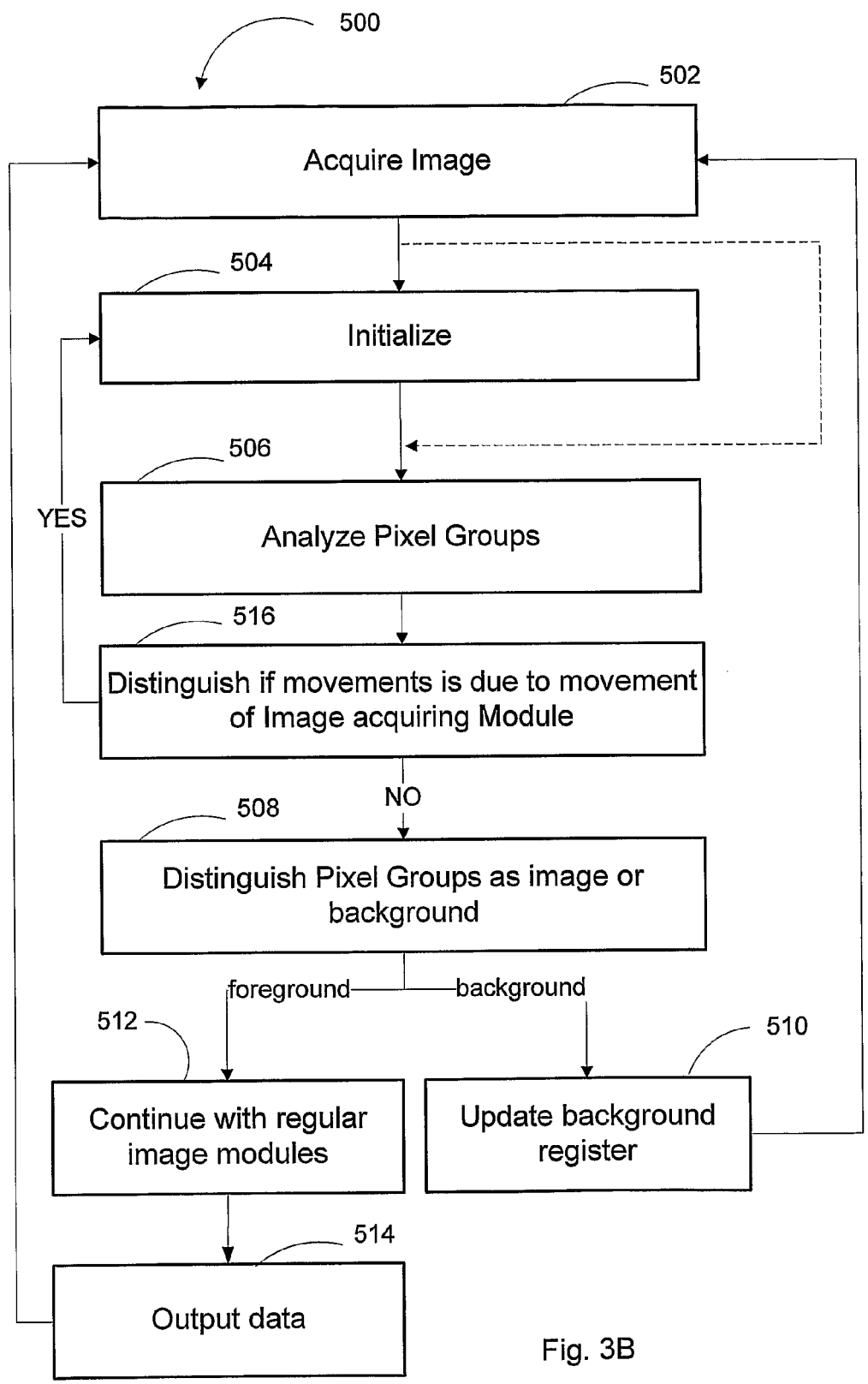

Turning now to FIG. 3B there is shown a HMI system flow chart as seen in flow chart 500. It is understood that FIG. 3B describes essentially a similar process as FIG. 3A and that steps 502-514 correspond to steps 402-414 respectively and may describe the same steps as described in FIG. 3A. However, there is an additional step which may be included in the HMI system flow, after pixel groups have been analyzed (detecting SDV, SFDV, and additional characteristics and measurements). According to step 506 the system distinguishes or characterizes if the movement is due to a change in position of the image acquiring module (as described in step 516). If so, the system may initialize (as shown in step 504), since the new image, its frames and groups of pixels may not be aligned to previously captured images frames and groups of pixels, such that errors may outcome from comparing the pixels, frames or other.

According to some embodiments of the present invention, distinguishing pixel groups as foreground (image) or background, as described in step 408, may also consist of tracking pixels that changed and tracking pixels that didn't change and using the two distinct groups every one or more frames to track foreground. For example, if we analyze a ticking clock in a first frame the dials may be in a first position and in a fourth frame in a second position. The foreground in the first frame will be the rest of the clock (numbers, frame etc.) comparing the two groups of data may be used to identify and track the ticking dials as foreground.

Figure 3C:
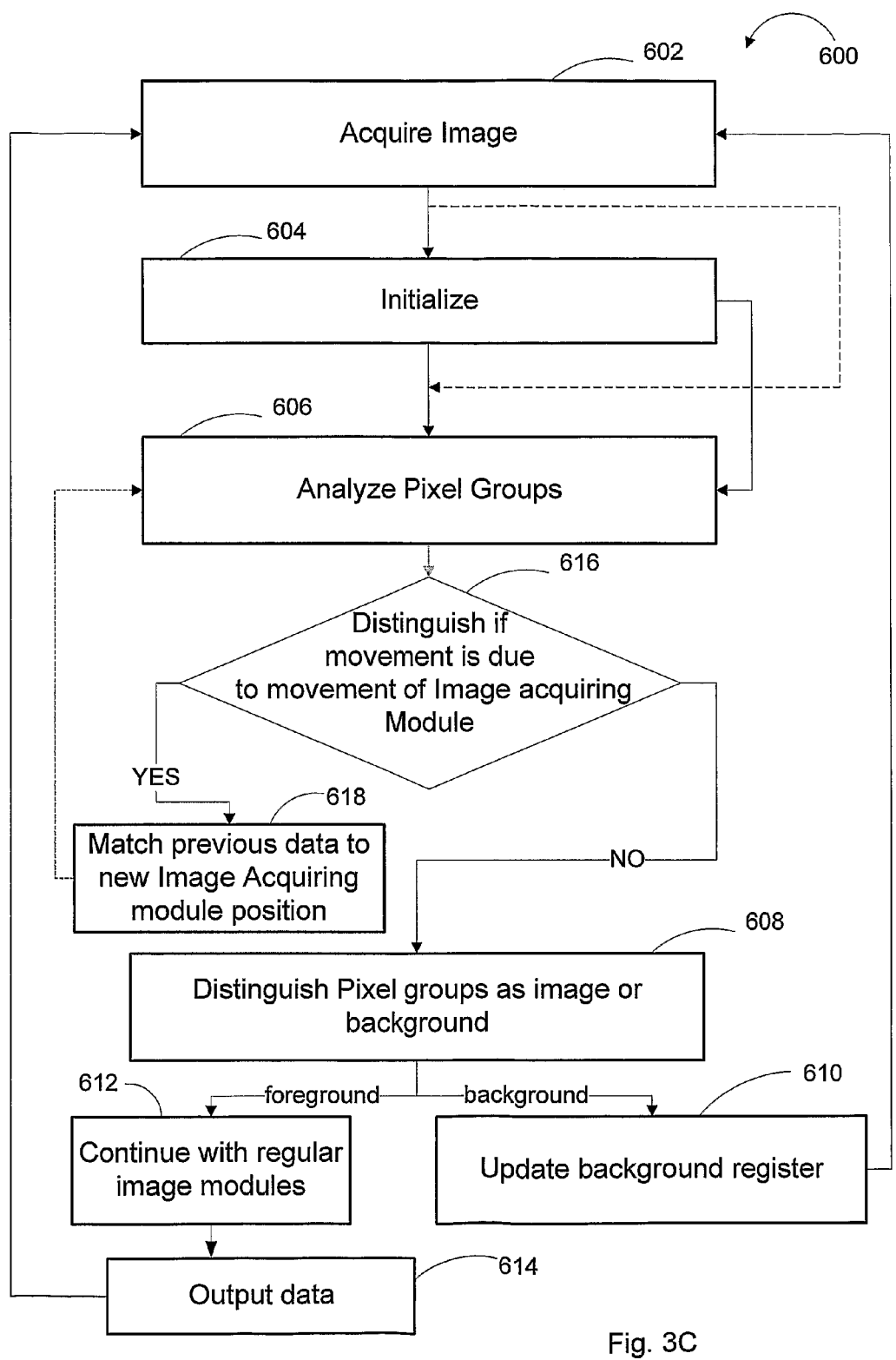

Turning now to FIG. 3C there is shown a HMI system flow chart as seen in flow chart 600. It is understood that FIG. 3C describes essentially a similar process as FIG. 3A and that steps 602-614 correspond to steps 402-414 respectively and may describe the same steps as described in FIG. 3A. However, there is an additional step which may be included in the HMI system flow. After pixel groups have been analyzed according to step 606, the system may distinguish or characterize if the movement is due to a change in position of the image acquiring module (as described in step 616) then the system may align the previously captured images, frames or groups of pixels or perform pixel offset compensation to match the new position of the camera (as shown in step 618). Subsequently the new image, its frames and groups of pixels may be aligned to previously captured images frames and groups of pixels so that the process of comparing data and analyzing the differences or detecting SDV may continue as shown in step 606. The processing unit may further register 3D or 2D movement of the camera or a new camera position and further utilize this information for analyzing the new frame.

Figure 4A:
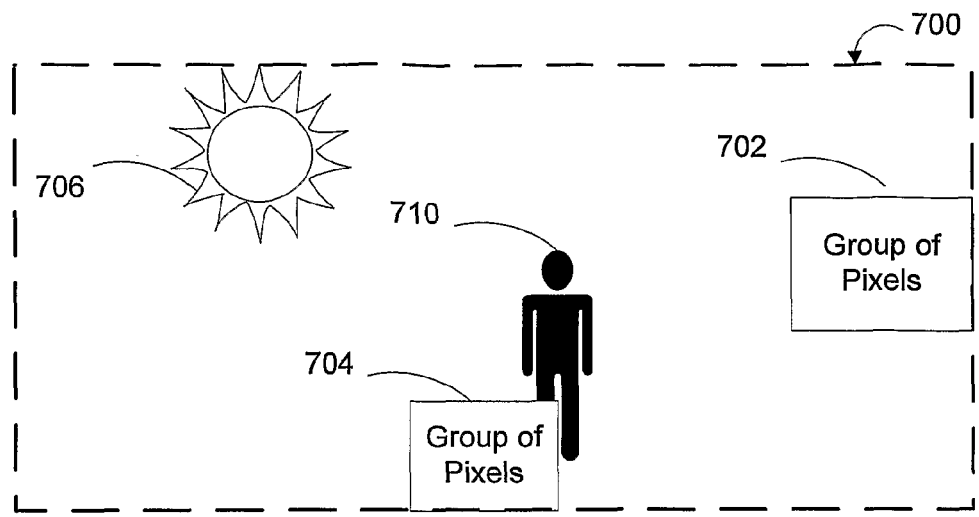
FIGS. 4A, 4B & 4C show semi-pictorial diagrams of a captured image.
Figure 4B:
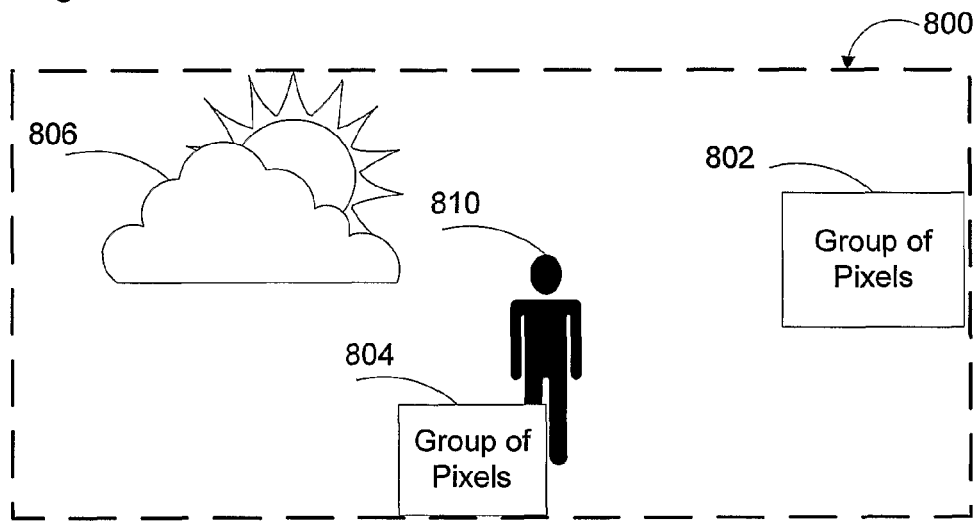

Turning now to FIGS. 4A and 4B there are shown semi-pictorial diagrams of a captured image such as images 700 and 800. According to some embodiments of the present invention, a captured image of image 700 may classify a pixel group(s) such as pixel group 702 as background. Another pixel group, such as pixel group 704 which in image 700 captures a user's leg, such as user 710, may be classified as foreground. While capturing image 700 the lighting may be that of a sunny sky as depicted by item 706. While capturing a subsequent image such as image 800 the lighting may change to a partly cloudy sky as depicted by item 806. Such a change in lighting (without a change in movement of background or foreground) may cause a deviation in pixels to be detected. Such a deviation may be characterized as a slight deviation in shade in a large part of the image or frame and subsequently the pixel group(s) may be classified identically to classification in previously captured images. Pixel group 802 and 804 which correlates to pixel group 702 and 704 will maintain classification of background or foreground according to their previous classification.

Figure 4C:
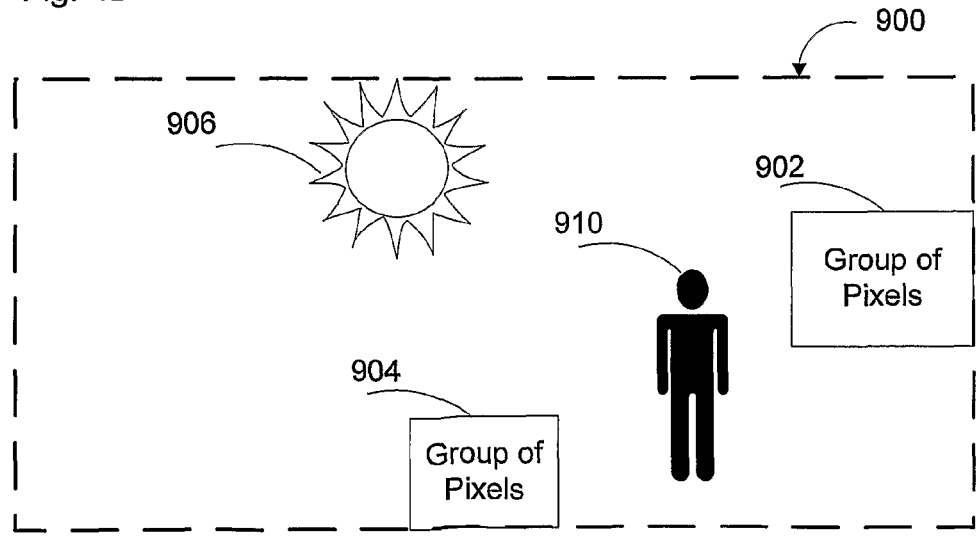

Turning now to FIG. 4C there is shown a semi-pictorial diagram of a captured image such as image 900. It is understood that image 900 is an example of a subsequent image to image 700. However, between captured image 900 the image acquisition module was accidently moved so that pixel group 902 and 904 do not correlate to groups of pixels 702 and 704. For example, assuming that user 910 did not move, pixel group 904, that would have captured user 910's leg if both image and image acquisition module had not moved is in a different location in the frame. Such a deviation in large groups of pixels throughout the image or frame may be classified as movement of the image acquisition module.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An image processing system comprising:
   an image processing unit configured to receive two or more images of a scene acquired by an imaging assembly and to classify a first pixel group of one of the two or more images as background or foreground, wherein classification performed by the processing unit is at least partially based on a spatiotemporal deviation value (SDV), which SDV is indicative of a spatiotemporal deviation between the first pixel group and a corresponding pixel group in a different image.

2. The system according to claim 1, wherein said processing unit is further configured to determine whether the first pixel group is within a defined spatial proximity to a previously classified pixel group appearing in the same frame as the first pixel group.

3. The system according to claim 2, wherein said processing unit is further configured to compare at least one visual attribute of the first pixel group against corresponding visual attributes of the previously classified pixel group.

4. The system according to claim 1, wherein said processing unit is configured to determine whether the first pixel group is located within a region between at least two other previously classified pixel groups appearing in the same frame as the first pixel group.

5. The system according to claim 4, wherein said processing unit is further configured to compare at least one visual attribute of the first pixel group against corresponding visual attributes of the at least two other previously classified pixel groups.

6. The system according to claim 1, wherein said processing unit is further configured to classify a second pixel group as background or foreground at least partially based on a proximity of the second pixel group to a previously classified pixel group appearing in the same frame as the second pixel group.

7. The system according to claim 6, wherein said processing unit is configured to classify the second pixel group as foreground when the at least one other previously classified pixel groups is classified as foreground.

8. The system according to claim 7, wherein the at least one other previously classified pixel group is classified as foreground because of an associated spatiotemporal deviation value being above a threshold.

9. The system according to claim 7, wherein the at least one other previously classified pixel group is classified as foreground based on feature detection.

10. An image based human machine interface comprising:
    an image acquisition assembly configured to acquire a set of two-dimensional images of a user, wherein substantially two or more images of the set are each associated with a different point in time; and
    a processing unit configured to derive one or more estimated user body positions by classifying one or more pixel group(s) as background or foreground at least partially based on a spatiotemporal deviation value (SDV), which SDV is indicative of a spatiotemporal deviation between the one or more pixel groups and corresponding pixel groups in a different image of the set.

11. The image based human machine interface according to claim 10, wherein classification of a first pixel group as either background or foreground is at least partially based on an SDV of the first pixel group and on a spatial relation between the first pixel group and at least one other previously classified pixel group appearing in the same frame as the first pixel group.

12. The image based human machine interface according to claim 11, wherein an SDV of a given pixel group being above a threshold results in the given pixel group being classified as foreground unless the SDV is characterized as the result of a High SDV Background Exception ("HSBE").

13. The image based human machine interface according to claim 12, wherein the HSBE is one or more phenomenon selected from the group consisting of: static motion in the frame, dynamic motion in the frame, non-unified motion in the frame, unified motion in the frame, a shift in the image acquisition assembly and a lighting shift.

14. The image based human machine interface according to claim 13, wherein a pixel group whose SDV is characterized as a result of a shift in the image acquisition assembly triggers said processing unit to reinitiate background classification processing.

15. The image based human machine interface according to claim 11, wherein an SDV of a given pixel group being below a threshold results in the given pixel group being classified as background unless the SDV is characterized as the result of a Low SDV Foreground Exception ("LSFE").

16. The image based human machine interface according to claim 15, wherein the LSFE is one or more phenomenon selected from the group consisting of a shift in the image acquisition assembly, a lighting shift, a near predefined element exception and a near foreground exception.

17. The image based human machine interface according to claim 11, wherein said processing unit is configured to classify the first pixel group as foreground when a second pixel group appearing in the same frame as the first pixel group is characterized as foreground and the first pixel group and the second pixel group both have one or more similar traits or visual attributes.

18. The image based human machine interface according to claim 11, wherein said processing unit is configured to classify the first pixel group as foreground when a second pixel group appearing in the same frame as the first pixel group is consistent with a predefined element or feature and the first pixel group and the second pixel group are within a predefined proximity of one another.

19. The image based human machine interface according to claim 13, wherein a pixel group whose SDV is characterized as a result of a lighting shift is not reclassified.

20. The image based human machine interface according to claim 13, wherein a pixel group whose SDV is characterized as a result of a shift in the image acquisition assembly triggers said unit to perform pixel offset compensation based on a detected change of position of said image acquisition assembly.

21. The image based human machine interface according to claim 20, wherein pixel offset compensation includes correlation of pixel group data associated with a first assembly position with a second assembly position.

22. An image processing method comprising:
acquiring a set of two-dimensional images of a user, wherein substantially each image of the set is associated with a different point in time; and
processing one or more estimated user body position by classifying one or more pixel group(s) as background or foreground at least partially based on spatiotemporal deviation values (SDVs) determined for each of the one or more pixel groups, which SDVs are indicative of spatiotemporal deviations between each of the one or more pixel groups and corresponding pixel groups in a different image.

23. The method according to claim 22, wherein classifying a given pixel group of the one or more pixel groups as either background or foreground is at least partially based on the measured SDV of the given pixel group and a spatial relationship between the given pixel group and at least one other previously classified pixel group appearing in the same frame as the given pixel group.

24. The method according to claim 23, wherein detecting the SDV of the given pixel group above a threshold results in the given pixel group being classified as foreground unless the SDV is characterized as the result of a High SDV Background Exception ("HSBE").

25. The method according to claim 24, wherein the HSBE is one or more phenomenon selected from the group consisting of: static motion in the frame, dynamic motion in the frame, non-unified motion in the frame, unified motion in the frame, a shift in the image acquisition assembly and a lighting shift.

* * * * *